Patented June 1, 1926.

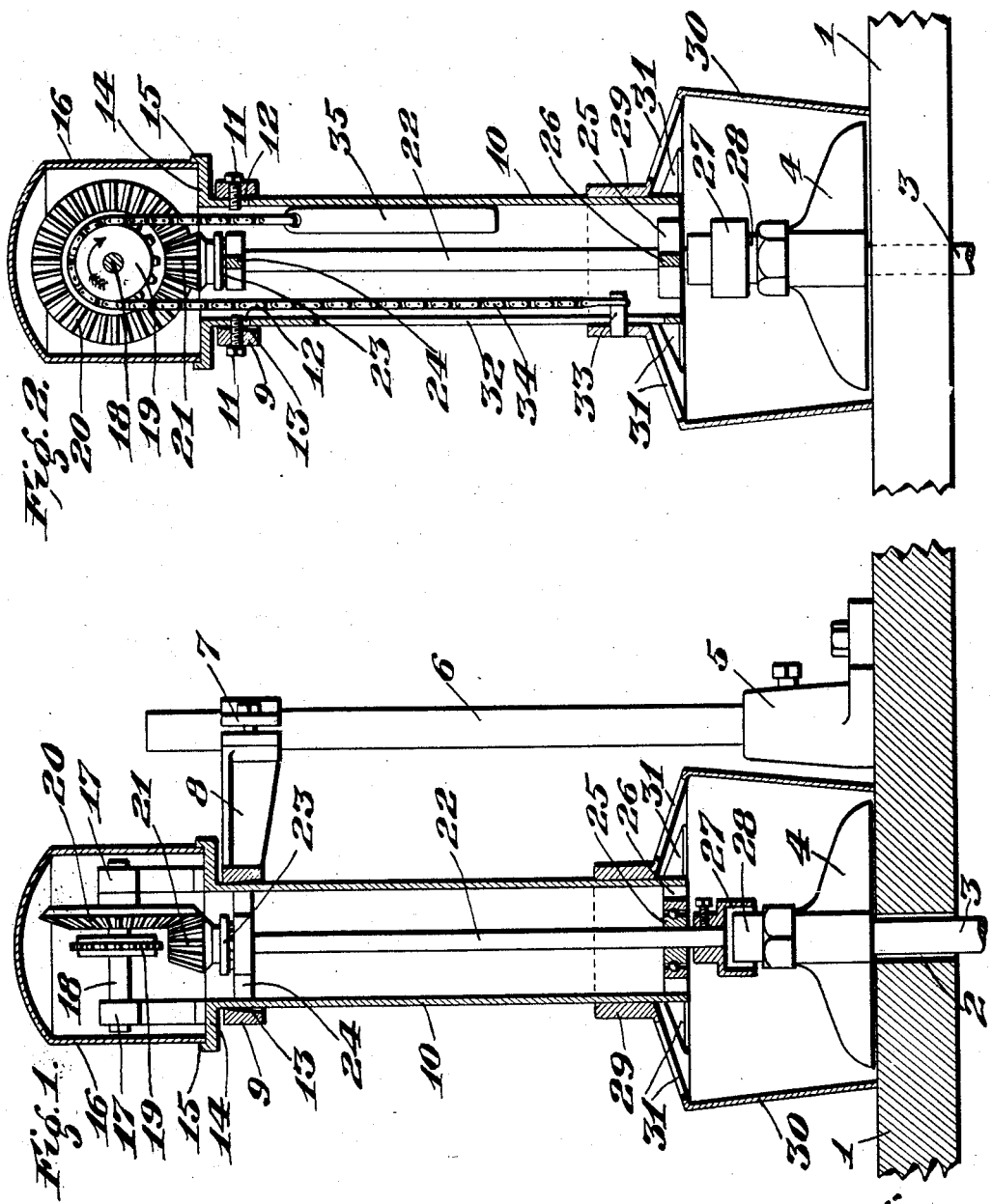

1,586,574

UNITED STATES PATENT OFFICE.

ROBERT F. PADEN, OF GLENDALE, MISSOURI.

SAFETY DEVICE.

Application filed July 14, 1924. Serial No. 725,825.

This invention relates to safety devices and more particularly to a guard for preventing injury to an operator by the rotating cutter of a wood shaping machine or cutter of similar character. It consists in a guard normally surrounding the cutter and being automatically lifted by the work being pressed against it, whereby the work may be readily brought into engagement with the cutter and conveniently manipulated at will and yet the guard affords full protection to prevent injury to the operator's hands by the cutter whether the cutter is idling or acting upon the work. It further consists in the parts and combinations and arrangements of parts hereinafter described and afterwards pointed out with particularity in the appended claims.

In the accompanying drawings forming part of this specification and illustrating a practical adaptation of the invention,—

Figure 1 is a vertical section through the guard and showing the parts in normal position; and Figure 2 is a similar view, the line of section being taken substantially at right angles to that of Figure 1.

Referring now to the drawings, the numeral 1 designates the work-table of an ordinary wood working machine, commonly known as a "shaper". Working through an opening 2 in the table is a shaft 3 having fastened thereon the usual cutter 4.

On the table is a supporting bracket or base 5, extending vertically upward from which is a standard 6, on the upper portion of which latter is clamped, as at 7, an adjustable bracket 8. At the free end of this bracket is an annular flange or collar 9 through which a cylindrical tube 10 is suspended as through the medium of screws, bolts or studs 11 secured in said flange or collar at diametrically-opposite points, as shown in Figure 2, said screws, bolts or studs having their inner end portions inserted loosely in slots 12 in said tube 10, and by which arrangement the tube is supported as the upper ends of the slotted portions rest on said screws, bolts or studs 11, yet the tube is permitted limited swinging motion in said flange or collar 9, the interior of which latter is slightly tapered or downwardly flaring, as at 13.

At the upper end of the tube 10 is an annular flange or collar 14 at the peripheral edge of which is a bead 15, and resting thereon and within said bead is a housing 16.

Journalled in bearings 17, supported on said flange or collar 14 is a shaft 18 on which is fastened a sprocket wheel 19 located diametrically of the axis of said tube 10, while adjacent to said sprocket wheel is a miter gear 20 which is also fixed to the shaft 18. Meshing with the miter gear 20 is a pinion 21 which is fixed on the upper end of a vertical shaft 22 extending axially of said tube 10. This shaft 22 is journalled in and supported by an ordinary antifriction bearing 23 mounted on a suitable cross member 24 in the tube 10, while the lower end portion of the shaft is carried through a suitable antifriction bearing 25 mounted on a cross member 26 at the lower end portion of the tube 10.

Fixed on the lower end of the shaft 22 is an annularly flanged member or collar 27 within which is received a cylindrical member 28 of less overall diameter than the interior diameter of the collar, said member 28 being preferably made of or covered by fiber, leather or some other suitable material which will take hold of said collar frictionally when pressed into contact therewith. This member 28 is fixed on the upper end of the cutter shaft 3, and the two shafts 3 and 22 being normally in substantially true axial alinement and there being considerable clearance between said collar 27 and said member 28 owing to the difference in diameters, as above described, the shaft 22 is normally at rest, but when said shaft 22 is moved laterally so as to bring the flange or collar 27 into peripheral contact with the member 28, the rotating shaft 3 thereby rotates the shaft 22, and, of course, owing to the arrangement of the miter gears 20 and 21, the shaft 18 is in turn rotated.

Sleeved on the lower end portion of the tube 10 is a collar 29 having attached thereto or integral therewith, as may be desired, an annular housing 30 whose circumferential face is preferably tapered with downward convergence, as shown, although it may be cylindrical but not quite so advantageous as will be later pointed out. This housing is preferably provided with a series of openings 31 in the top wall of ample size to permit the cutter 4 to be observed by the operator yet small enough to prevent entrance of the operator's hand and possible injury thereto, and the annular wall may be perforated throughout or constructed of foraminated material for the same purpose, if desired, but not necessarily so.

The tube 10 has an elongated, longitudinal slot 32 at one side, and on the collar 29 is a pin 33 which is projected inward through said slot and has one end of a sprocket chain 34 attached thereto. The chain is carried up and over the sprocket wheel 19 and has a weight 35 attached to its opposite end. The weight 35 is preferably such as to nearly counterbalance the weight of the housing 30; that is to say, it slightly underbalances said housing, so that when the housing is raised, as will presently appear, its weight is counterbalanced to some extent, and yet the housing always tends to drop back to its normal position when relieved of the raising power.

In practice, the housing 30 normally rests on the work table 1, completely surrounding and guarding the cutter 4, which latter, of course, rotates at a very high speed. When the operator presses the work on the table against the housing the tube 10 has imparted thereto a swinging movement on its supporting screws, bolts or studs 11, so that the collar 27 on the shaft 22 is brought into contact with the periphery of the member 28 on the shaft 3, thereby causing rotation of said shaft 22 by the shaft 3. The sprocket wheel 19 on the shaft 18 being in turn rotated, through the medium of the gears 20 and 21 and in the direction indicated by the arrow (see Figure 2), the chain 34 travels therewith and lifts the housing 30 on the tube 10 until the work passes thereunder, whereoupon the tube 10 swings back to its normal vertical suspended position and the housing 30, of course, drops back upon the upper face of the work because the shaft 22 has ceased rotating when the contact between the collar 27 and member 28 is broken.

When the work is withdrawn from under the housing 30, the latter instantly drops down upon the table 1, back to its normal position.

As above first described, the housing 30 may be cylindrical, but it is preferable to have the annular wall of the housing tapered with downward convergence, substantially as shown, for the reason that the work usually is a board having a square edge and instead of pressing flatwise against the wall of the housing, as would occur if the wall were cylindrical, its corner only engages the housing, thereby greatly minimizing friction which might tend to resist the lifting of the housing.

By having the bracket 8 adjustable vertically on the standard 6, as may be readily accomplished by loosening the clamping portion 7 and sliding it up or down the standard and then tightening it, the tube 10 is thereby raised or lowered, as the case may be, the limitation of such adjustment, of course, being governed by the relative depth of the socket portion of the collar 27, as there must always be sufficient overlap of the collar about the member 28 to afford that engagement with the latter so as to effect the rotation of the shaft 22 when the housing is pressed by the work.

Obviously the invention admits of considerable modification within its spirit and scope as defined by the appended claims. It is, therefore, not limited to the specific construction and arrangement shown in the accompanying drawings.

What is claimed is:

1. In a guard of the character described, a vertically movable housing normally surrounding the cutter, means for swingably supporting said housing, and means for raising said housing including a normally inactive power element and a correlated power element operating continuously with the operation of the cutter, said two mentioned power elements being normally disengaged but being cooperatively engaged while said housing is subjected to forcible lateral pressure.

2. In a guard of the character described, a vertically movable housing normally surrounding the cutter, means for swingably supporting said housing, and means for raising said housing comprising a rotatable, normally inactive power element supported with said housing and a detached power element rotatable substantially axially with said first mentioned power element in cooperative relation thereto, said second mentioned power element rotating continuously with the cutter and whereby said housing is raised when it is subjected to forcible lateral pressure.

3. In a guard of the character described, in combination with a rotating cutter, a normally stationary, vertically movable housing surrounding said cutter, means for swingably supporting said housing, means for raising said housing comprising connected gearing compensatorily supported with said housing, said means including a rotatable power element normally in substantial axial alinement with the axis of said cutter, and a normally disengaged power element in cooperative relation to said first mentioned power element rotatable with said cutter, said power elements being engaged frictionally when said housing is subjected to forcible lateral pressure.

4. In a guard of the character described, a housing normally surrounding the cutter, said housing being capable of vertical movement and limited lateral movement, and means for raising said housing including a normally inactive power element and a normally disengaged power element in cooperative relation to said first mentioned power element, said second mentioned power element operating continuously with the cutter and being engaged by said first mentioned power element when said housing is subjected to forcible lateral pressure, said housing being self-restored to normal neutral position when relieved of said lateral pressure.

5. In a guard of the character described, in combination with a rotating cutter, a housing normally surrounding said cutter, means for supporting said housing in vertically movable and limited laterally movable relation to said cutter, means for raising said housing on its support comprising a sprocket and chain gearing, a driving gear for said sprocket and chain gearing including a power element normally in substantially axial alinement with the axis of said cutter, and a normally disengaged power element rotatable axially with said cutter in engaging relation to said first mentioned power element, whereby, when forcible lateral pressure is brought to bear on said housing said gearing is actuated to raise the housing and when said power elements are disengaged as said housing is relieved of lateral pressure said housing is self-restored to normal neutral position.

6. In a guard of the character described, in combination with a work-supporting table and a rotating cutter thereon, of a supporting element swingably supported above said cutter, a housing vertically movable on said supporting element, a horizontal shaft on said supporting element having a sprocket wheel thereon, a sprocket chain carried on said sprocket wheel, having one end attached to said housing and having a weight on its opposite end, a bevelled gear on said shaft, a driving shaft extending longitudinally of said supporting element, a bevelled pinion on said driving shaft in working engagement with said bevelled gear on said horizontal shaft, a collar on the lower end of said driving shaft, and a driving element rotatable axially with said cutter, said driving element being projected within said collar on the lower end of said driving shaft but normally out of engagement therewith, whereby to become engaged frictionally when said housing is subjected to forcible lateral pressure and to become disengaged when said housing is relieved of said lateral pressure.

ROBERT F. PADEN.